Figure 1:
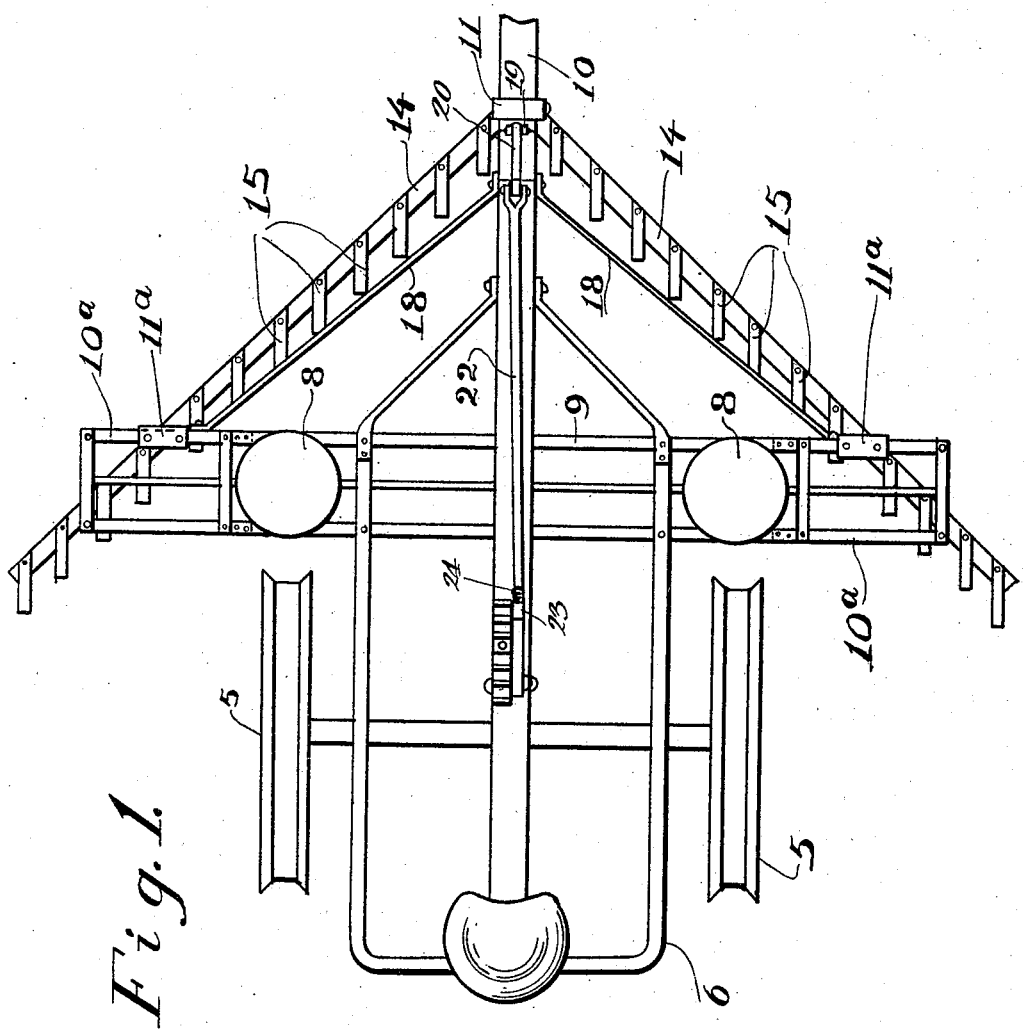

A. M. EVENSON & E. J. BEAL.
HARROW.
APPLICATION FILED AUG. 13, 1914.

1,179,295.

Patented Apr. 11, 1916.
2 SHEETS—SHEET 1.

Witnesses
Ernest A. Perham.

Inventors
A. M. Evenson. E. J. Beal.
By
Attorney

A. M. EVENSON & E. J. BEAL.
HARROW.
APPLICATION FILED AUG. 13, 1914.
1,179,295.
Patented Apr. 11, 1916.
2 SHEETS—SHEET 2.
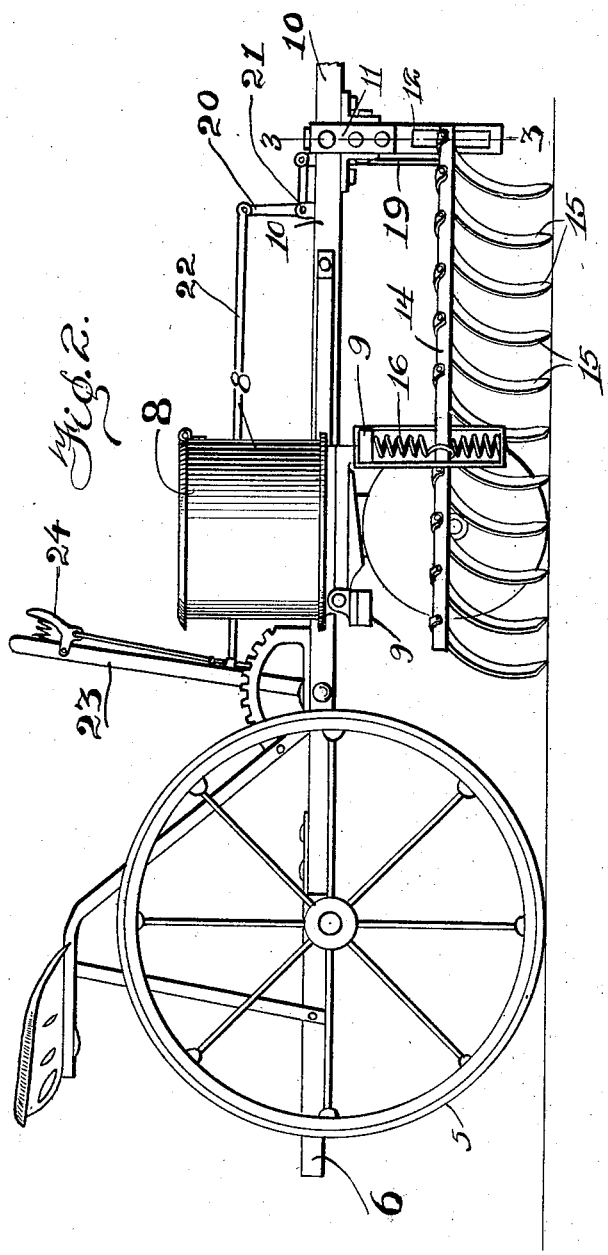
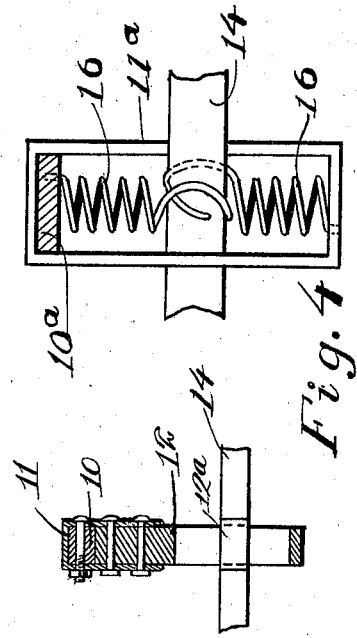
Witnesses
Robert M. Sutphen
Chas. B. Seibold
Inventors
A. M. Evenson
E. J. Beal
By
Attorney

UNITED STATES PATENT OFFICE.

ALBERT M. EVENSON AND EDWARD J. BEAL, OF RUTHTON, MINNESOTA.

HARROW.

1,179,295.  Specification of Letters Patent.  Patented Apr. 11, 1916.

Application filed August 13, 1914. Serial No. 856,645.

*To all whom it may concern:*

Be it known that we, ALBERT M. EVENSON and EDWARD J. BEAL, citizens of the United States, residing at Ruthton, in the county of Pipestone and State of Minnesota, have invented certain new and useful Improvements in Harrows; and we do hereby declare the following to be a full, clear, and exact description of the invention, such as will enable others skilled in the art to which it appertains to make and use the same.

This invention relates to agricultural implements, and more particularly to a combined corn planter and cultivator.

The invention has for its object to provide a planter with a harrow or other cultivating attachment whereby the ground is worked during the process of planting.

With this and other objects in view, the invention consists in the novel construction, arrangement and formation of parts as will be hereinafter specifically described, claimed and illustrated in the accompanying drawings, in which, Figure 1 represents a top plan view of the combined planter and cultivator, Fig. 2 represents a side elevation thereof, Fig. 3 represents an enlarged detail sectional view on the line 3—3 of Fig. 2, and Fig. 4 represents an enlarged detail view partly broken away and the resilient supporting means for the outer ends of the teeth bars.

Referring to the drawings in detail, wherein similar reference numerals designate corresponding parts throughout the several views, the numeral 5 indicates a pair of wheels rotatably mounted on and supporting the frame 6 of the planter of any preferred construction having the usual hoppers 8 for containing the seeds. The hoppers 8 are suitably supported upon the transverse beams 9 and the frame 6 and the usual draft pole 10 is secured to said frame.

Extension frames 10$^a$ are secured to the outer ends of the transverse beams 9 and are provided with rectangular frames 11$^a$. An inverted U-shaped strap 11 is secured in inverted position on the pole 10 and the free extremities thereof are suitably bolted to a block 12 having a vertical slot therein receiving the member 12$^a$ rigidly connecting the forward extremities of the tooth bars 14 which extend rearwardly and outwardly from said block 12. The vertically movable bars 14 extend through the rectangular frames 11$^a$ and are provided with a plurality of harrow teeth 15. Springs 16 are arranged within the frames 11$^a$ and are so arranged as to normally retain the tooth bars 14 in downwardly extended position. Braces 18 are secured at their forward extremities to the pole 10 and are secured at their rear extremities to the frames 11$^a$ bracing and reinforcing the latter. A strap 19 is secured to the bars 14 and is secured at its upper extremity to one arm of a bell crank 20 pivotally secured at 21 to the pole 10. The upper arm of the bell crank is pivotally connected with a connecting rod 22 secured at its rear extremity to a hand lever 23 provided with a suitable locking device 24 whereby said lever may be locked in adjusted position. By releasing and moving the lever 23 rearwardly the bars 14 and teeth 15 are moved upwardly out of engagement with the ground.

What we claim is:—

1. A harrow including a wheel mounted frame and a draft pole, a vertically slotted block secured to said pole, a pair of tooth bars, a member rigidly connecting the forward extremities of said tooth bars and slidably received within said slotted block, means normally retaining the rear extremities of said tooth bars in downwardly extended position, and means for raising said tooth bars.

2. A harrow comprising a wheel mounted frame including a draft pole, a block depending from said draft pole having a vertically elongated slot therein, a pair of rearwardly diverging tooth bars, a member rigidly connecting the forward extremities of said tooth bars and being slidably mounted in said slot, means normally retaining the rear extremities of said tooth bars in downwardly extending position, a pivoted hand lever, and means connecting said hand lever with the forward extremities of said tooth bars for elevating the latter.

3. A harrow comprising a wheel mounted frame including a forwardly directed draft pole, a pair of rearwardly diverging and vertically movable tooth bars, means for guiding the vertical movement of said tooth bars, rectangular frames supported by said wheel mounted frame and receiving the rear extremities of said tooth bars, and tensioning means arranged within said rectangular frames and connected with said tooth bars.

In testimony whereof we affix our signatures in presence of two witnesses.

ALBERT M. EVENSON.
EDWARD J. BEAL.

Witnesses:
N. C. BERTELSEN,
C. G. FASSETT.

Copies of this patent may be obtained for five cents each, by addressing the "Commissioner of Patents, Washington, D. C."